United States Patent [19]
Kerboul

[11] Patent Number: 4,852,421
[45] Date of Patent: Aug. 1, 1989

[54] CONTROL DEVICE FOR AN AUTOMOBILE VEHICLE GEARBOX

[75] Inventor: Güy Kerboul, Maurecourt, France

[73] Assignees: Automobiles Peugeot, Paris; Automobiles Citroen, Neilly/Seine, both of France

[21] Appl. No.: 198,243

[22] Filed: May 25, 1988

[30] Foreign Application Priority Data

May 25, 1987 [FR] France ............... 87 07334

[51] Int. Cl.$^4$ ............................. F16H 57/06
[52] U.S. Cl. .................. 74/476; 74/473 R; 74/477
[58] Field of Search ............... 74/473 R, 476, 477

[56] References Cited

U.S. PATENT DOCUMENTS

| | | | |
|---|---|---|---|
| 3,866,488 | 2/1975 | Nakata et al. | 74/476 X |
| 4,466,306 | 8/1984 | Katayama | 74/477 |
| 4,510,818 | 4/1985 | Inui | 74/477 |
| 4,567,785 | 2/1986 | Reynolds et al. | 74/477 |
| 4,660,434 | 4/1987 | Inui et al. | 74/477 |

FOREIGN PATENT DOCUMENTS

| | | |
|---|---|---|
| 0139261 | 5/1985 | European Pat. Off. . |
| 0148387 | 7/1985 | European Pat. Off. . |
| 2332151 | 6/1977 | France . |
| 57-6157 | 1/1982 | Japan ............... 74/476 |

Primary Examiner—Leslie A. Braun
Assistant Examiner—Janice Chartoff
Attorney, Agent, or Firm—Burns, Doane, Swecker & Mathis

[57] ABSTRACT

The control device is of the type in which the movable elements for engaging the gear ratios are shifted by means of parallel slidable yokes (40, 42, 46, 48) on which acts a main control finger member (20) which pivots for alternately sliding each of the yokes in at least one direction and causing the engagement of a gear ratio. According to the invention, the device further comprises an auxiliary control finger member (54) which is capable of pivoting about the axis of the control shaft (12) for sliding a yoke (46) of the two lateral end yokes in a first direction and causing the engagement of the reverse gear ratio, it only being possible to shift the other lateral end yoke (48) by means of the main control finger member (20) in the opposite direction for selecting the forward gear ratio of the highest rank. The other yoke (48) is provided with a ramp (56) with which cooperates the main control finger member (20) when it is shifted in the first direction for causing its lateral disengagement from the other yoke (48) and permitting a driving in rotation of the auxiliary control finger member (54) by driving apparatus interconnecting the two control finger members.

8 Claims, 4 Drawing Sheets

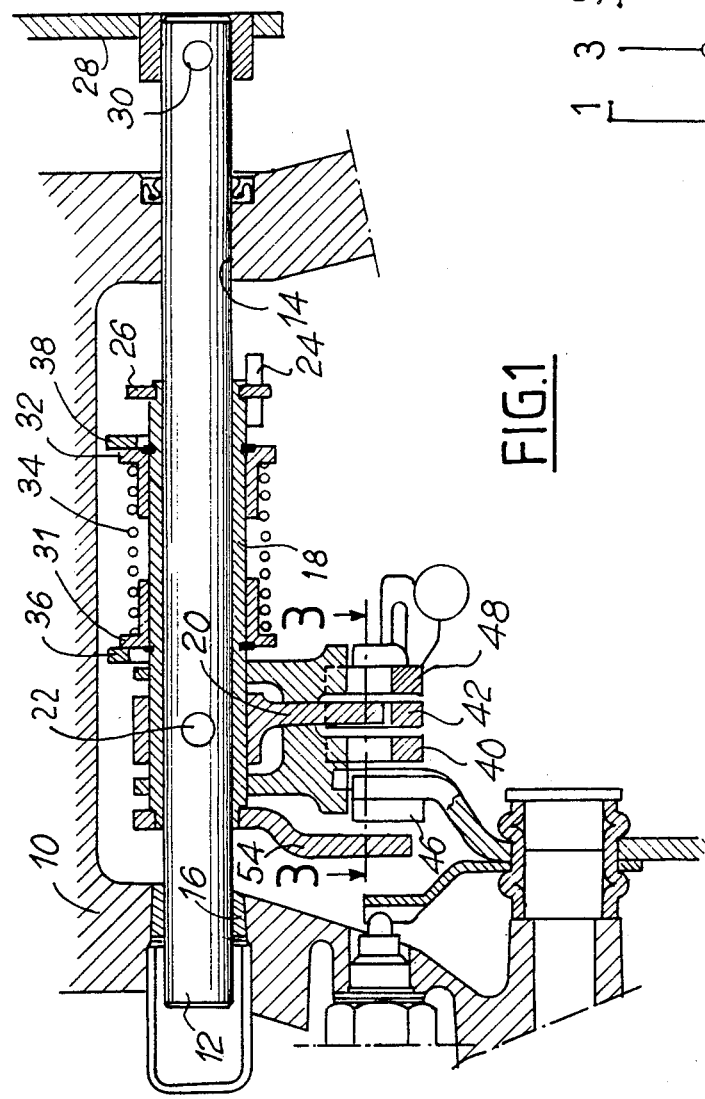
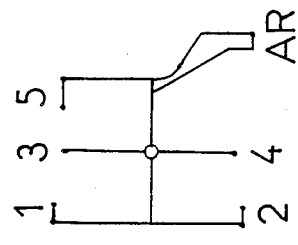
FIG.1
FIG.2

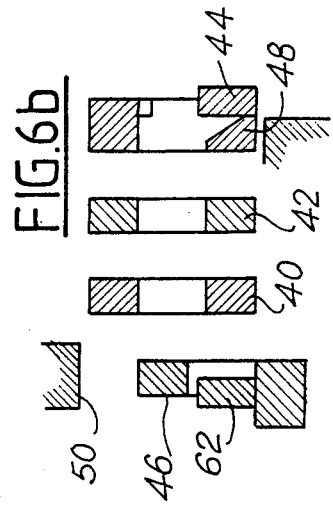
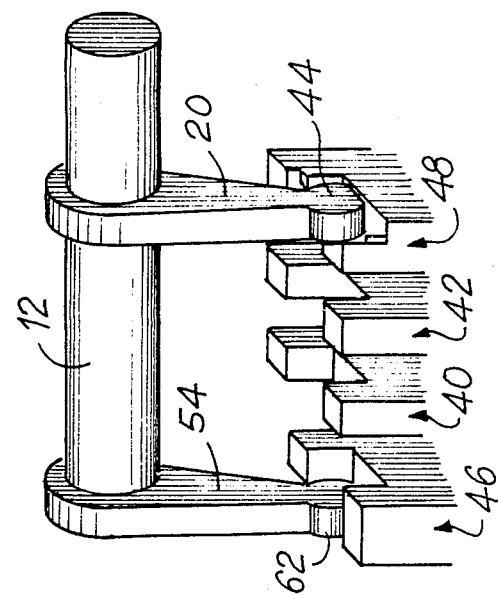
FIG.5b
FIG.5a
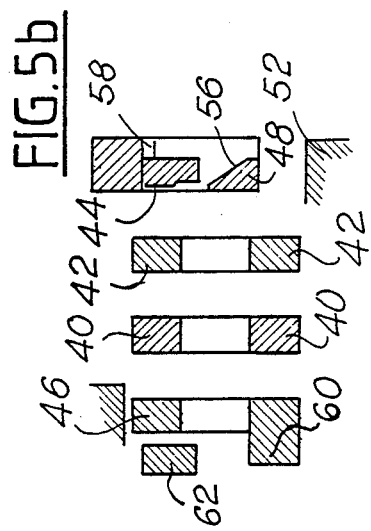
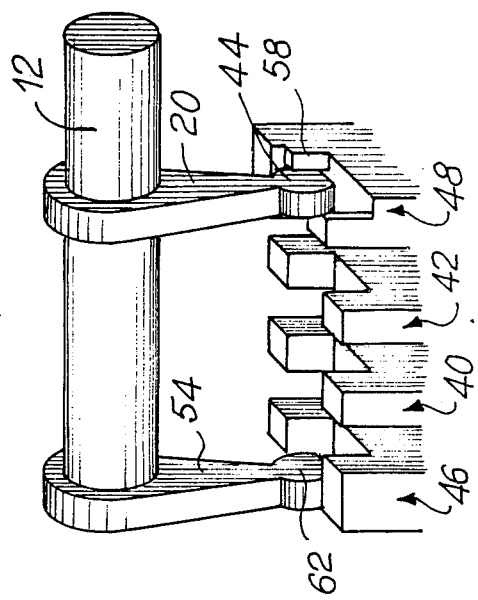
FIG.6b
FIG.6a

CONTROL DEVICE FOR AN AUTOMOBILE VEHICLE GEARBOX

The present invention relates to a device for controlling an automobile vehicle gearbox in which the movable elements, whether they concern sliding gears, synchronizer sliding elements or sleeves, are shifted by means of parallel slidable yokes on which act a main control finger member which pivots for alternately sliding each of the yokes in at least one direction and change the gear ratio. The main finger member is connected to rotate and move in translation with a control shaft which is slidable in a direction perpendicular to the common sliding direction of the yokes so as to permit the engagement of the main control finger member in one of the yokes for selecting at least one gear ratio.

In this type of gearbox having a plurality of forward gear ratios, and in particular in the case of a gearbox having five gear ratios or speeds, the gear lever having two perpendicular directions of pivotal movement is shifted along four parallel paths. The two central paths permit, after selection, engaging the first four forward gear ratios while the two lateral end paths respectively permit engaging the fifth forward gear ratio and the reverse gear. Apart from the fact that it involves large movements of the gear lever, this design requires a relatively complicated mechanism involving large movements of the control linkage connecting the gear lever to the gearbox. The result of this complexity is a relatively large overall size and lower reliability of the gearbox control device.

An object of the present invention is to propose a control for a gearbox which overcomes the drawbacks just mentioned and permits effecting the selection of the forward gear ratio of the highest rank and of the reverse gear in the same lateral position of the gear lever, i.e. along a single selection path.

The invention therefore provides a control device of the aforementioned type which comprises an auxiliary control finger member which is pivotable about the axis of the control shaft for causing the sliding of one of the two lateral end yokes in a first direction and engaging the reverse gear ratio, it only being possible to shift the other lateral end yoke by means of the main control finger member in the opposite direction for changing to the forward gear ratio of the highest rank, a first transverse abutment preventing the sliding of the reverse yoke in said opposite direction, a second transverse abutment preventing the sliding of said other yoke in said first direction, said other yoke being provided with a ramp with which cooperates the main control finger member when it is shifted in said first direction for causing its lateral disengagement from said other yoke and permitting the pivoting of the auxiliary control finger member by driving means interconnecting the two control finger members.

With such an arrangement, and for example in the case of a gearbox having five forward gear ratios, the driver merely has to shift the gear lever in only three parallel paths, the reverse gear or the fifth gear being engaged by shifting the gear lever in one of said paths respectively in one or the other direction.

To engage the reverse gear, notwithstanding the presence of said second transverse abutment, the ramp is so oriented as to cause the lateral disengagement of the main finger member from the side opposed to the other yokes.

According to a first embodiment of the invention, the auxiliary control finger member is also connected to rotate and move in translation with the control shaft; the lateral distance between the two control finger members which are thus interconnected exceeding the lateral distance between the two lateral end yokes.

According to a second embodiment of the invention, the control device comprises a control stirrup mounted on the control shaft relative to which it is freely pivotable and immobilized in translation relative to the case of the gearbox, said stirrup having one lateral branch constituting the auxiliary control finger member permanently engaged in the reverse gear yoke, whereas the other branch includes at its end a driving yoke which is in juxtaposed relation to said other yoke for engaging the forward gear ratio of the highest rank, in which comes to be engaged the main control finger member after having been laterally disengaged from said other yoke when engaging the reverse gear.

Further features and advantages of the invention will be apparent from the following description with reference to the accompanying drawings, in which:

FIG. 1 is a simplified partial sectional view of a gearbox having five gear ratios or speeds arranged in accordance with the teaching of the present invention;

FIG. 2 is a diagram showing the movements of the gear lever for selecting and engaging the various gear ratios of the gearbox;

FIG. 3b is a sectional view taken on line 3—3 of FIG. 1, the control device being in the position illustrated in FIG. 3a;

FIGS. 5a and 5b are views similar to those of FIGS. 3a and 3b, the fifth gear ratio being engaged;

Figure 3B:
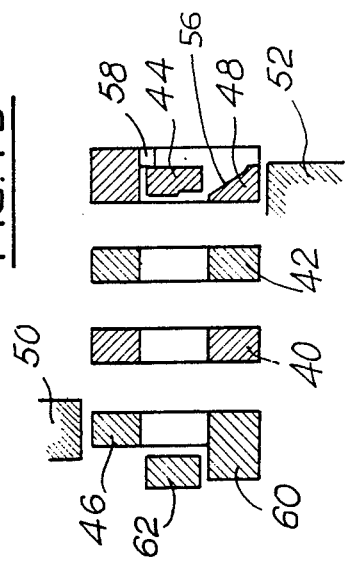
Figure 3A:
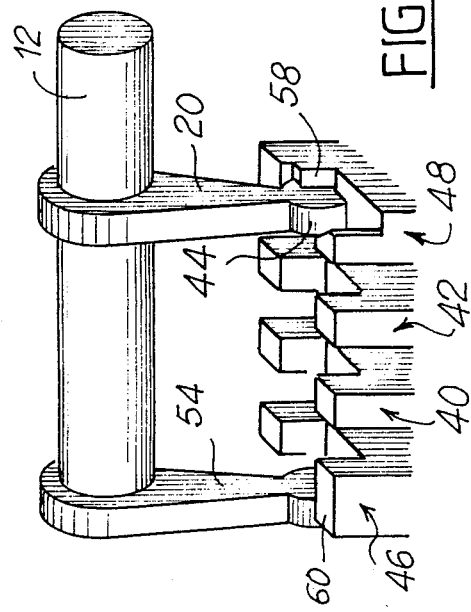
FIG. 3a is a diagrammatic perspective view of the control device shown in FIG. 1, the gear lever being in the neutral position between the third and fourth gear ratios.
Figure 7B:
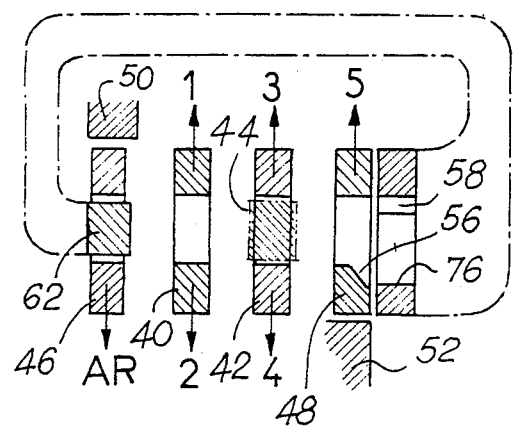
Figure 7A:
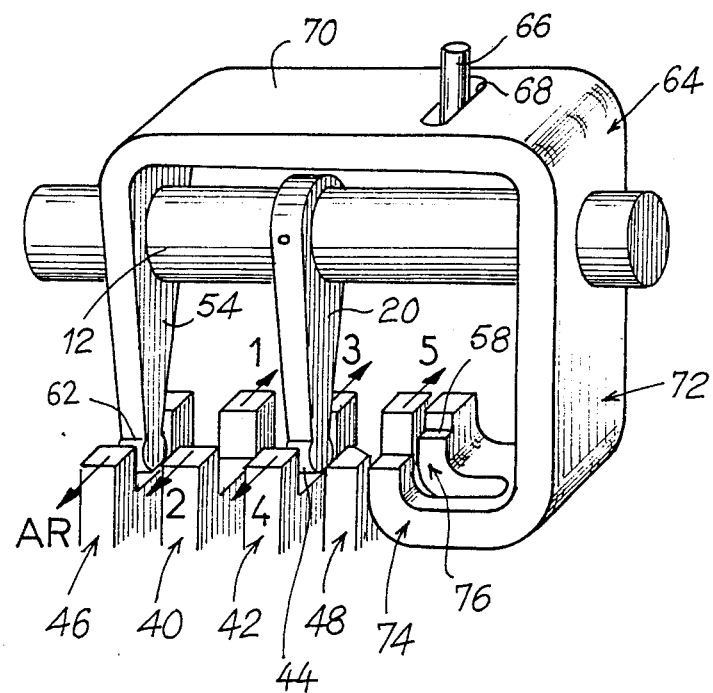

FIGS. 6a and 6b are views similar to those of FIGS. 3a and 3b, the reverse gear being engaged, and FIGS. 7a and 7b are views similar to those of FIGS. 3a and 3b of a second embodiment of the control device of the invention.

FIG. 1 shows an internal control device of a gearbox, a part of the case 10 of which can be seen. The control device comprises a control shaft 12 which permits the selection and the engagement of the various gear ratios. The shaft 12 is rotatively and slidably mounted in two bearings 14 and 16 of the case 10. A control sleeve 18 is mounted on the control shaft 12 to which it is connected in translation and rotation. A main control finger member 20 is mounted on the sleeve 18 and a pin 22 connects the main control finger member 20 and the control sleeve 18 to move in translation and rotation with the control shaft 12.

The control shaft 12 is shifted laterally by means of a selection lever having an end portion 24 which drives a washer 26 mounted on the sleeve 18. The lateral movements, i.e. the movements parallel to its main axis, of the control shaft 12 permit the selection of the gear ratios, as will be explained hereinafter. The control shaft 12 is rotated by means of a gear shift lever 28 fixed by means of a pin 30 to a free end portion of the control shaft 12. Under the action of the shift lever 28, the control shaft 12 can pivot about its axis in either direction for engaging a gear ratio of the gearbox.

At rest, i.e. in the neutral position, the control shaft occupies a position illustrated in FIGS. 1, 3a and 3b, in which it is maintained by an automatic re-centering device formed by two slidable rings 31 and 32 between which is interposed a spring 34 which biases these rings away from each other. The two slidable rings 30 and 32 respectively bear against two fixed abutments 36 and 38 connected to the case 10.

The control device according to the invention is illustrated in the Figures in its application to the control of the engagement of a gear ratio of a gearbox having five forward gear ratios and one reverse gear ratio. Conventional movable elements (not shown) for the alternative engagement of gears corresponding to the various gear ratios may be shifted by means of four slidable yokes respectively integral with parallel slides which are arranged in the case 10.

The two central yokes 40 and 42 are allocated to the engagement of the first four forward gear ratios. For this purpose, they are each slidable in a first direction parallel to their common direction for changing to the corresponding ratio of even rank. Each of these two yokes is also slidable in the opposite direction for changing to a forward gear ratio of odd rank. Consequently, as shown in FIGS. 3a and 3b, the left central yoke 40 permits engaging the first and second forward gear ratios while the right central yoke 42 permits engaging the third and fourth forward gear ratios.

The selection and the changing of these forward gear ratios are effected in the conventional manner by the free end 44 of the main control finger member 20 which is capable of laterally engaging in a recess provided for this purpose in each of the slidable yokes, subsequent to a selection movement, then causing the sliding of a yoke in either direction for changing to a gear ratio under the action of the rotation thereof caused by the control shaft 12.

The control device further comprises two lateral end yokes 46 and 48. The first lateral end yoke 46, which is on the left side as viewed in the Figures, permits changing to the reverse gear. The reverse gear ratio is engaged by sliding said first lateral end yoke in the first direction, i.e. downwardly as viewed in FIG. 3b, corresponding to the direction for changing to the second and fourth forward gear ratios. The control device comprises a first transverse abutment 50 disposed in the case 10 in confronting relation to the reverse gear changing yoke 46 and which prevents the sliding of the latter in the opposite direction, i.e. in the direction corresponding to changing to the first and third forward gear ratios.

The other lateral end yoke 48, on the right side as viewed in the Figures, permits the selection of and engaging the forward gear ratio of the highest rank. Changing to the forward gear ratio of the highest rank, in the presently described embodiment the fifth gear ratio, is effected by causing the lateral end yoke 48 to slide in the direction opposed to said first direction corresponding to the engagement of the reverse gear or the second and fourth forward gear ratios. The control device includes a second transverse abutment 52 disposed in confronting relation to the lateral end yoke 48 and preventing the sliding of the latter in the first direction.

According to the invention, the selection and the engagement of the reverse gear are effected by an auxiliary control finger member 54 while the selection and engagement of the forward gear ratio of the highest rank are effected by the main control finger member as for the engagement of the forward gear ratios of lower rank.

For the purpose of causing the sliding of the lateral end yoke 46, the auxiliary control finger member 54 is pivotable about the axis of the main control shaft 12.

In the first embodiment of the invention shown in FIGS. 1 to 6b, the auxiliary control finger member 54 is mounted on the control sleeve 18 and therefore on the main control shaft 12 to which it is connected in rotation and translation. Consequently, any rotation or movement in translation of the control shaft 12 causes the lateral translation of the simultaneous rotation of the two control finger members 20 and 54 which are interconnected. The mean lateral distance D1 between the two control finger members 20 and 54 must, according to the present invention, exceed the mean lateral distance D2 between the two lateral end yokes 46 and 48. This feature ensures that the two control finger members can in no case be simultaneously in a position for engaging the reverse gear ratio and respectively the forward gear ratio of the highest rank.

In order to permit the engagement of the reverse gear ratio and the fifth gear ratio by an action on the gear lever along the same path but in opposite directions, the lateral end yoke 48 is provided with a ramp 56. The end 44 of the main control finger member 20 cooperates with the ramp 56 when it is shifted in the first direction, i.e. in a direction corresponding to the engagement of the reverse gear, in order to cause the lateral disengagement of the end 44 of the main finger member 20 from the lateral end yoke 48. The inclined ramp 56 is oriented to the right so as to cause the lateral disengagement of the main control finger member 20 and the lateral translation toward the right of the control shaft 12, i.e. to the side opposed to the other selection and changing yokes. The lateral end yoke 48 has an extension 58 which constitutes a lateral abutment with which cooperates the end 44 of the main control finger member 20 when it is engaged in this lateral end yoke 48, for limiting its engagement travel toward the right and putting it in a position for selecting the forward gear ratio of the highest rank.

Figure 4B:
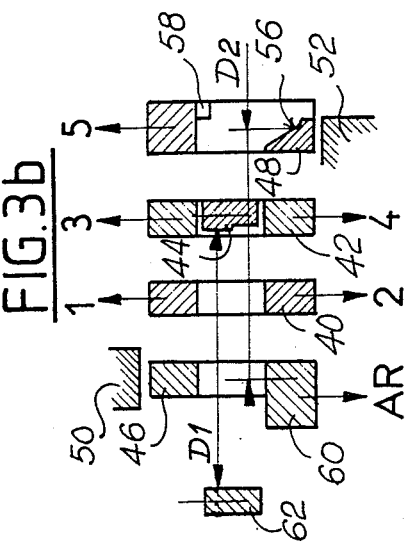
FIGS. 4a and 4b are views similar to those of FIGS. 3a and 3b, the gear lever being in the position for selecting the fifth gear ratio or the reverse gear.
Figure 4A:
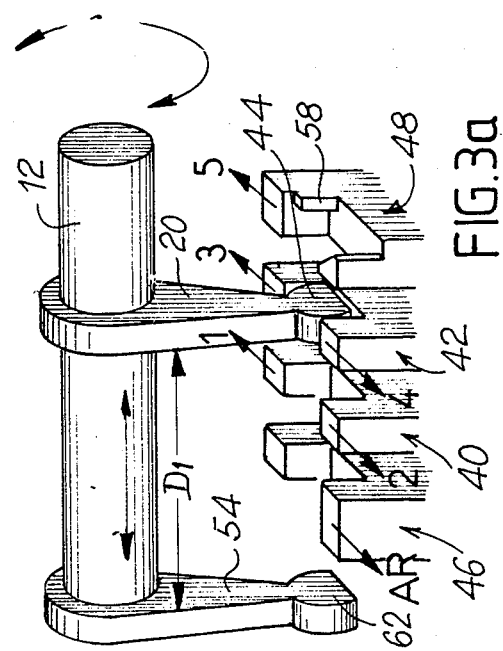

The lateral end yoke of the reverse gear 46 also includes an extension 60 which extends laterally toward the left, i.e. to the side opposed to the other selection yokes, and in confronting relation to which is located the free end 62 of the auxiliary control finger 54 when the main control finger member 20 is engaged in the other lateral end yoke 48, as can be seen in FIGS. 4a and 4b. The lateral extension 60 permits effecting simultaneously the start of the engagement of the reverse gear ratio while the end 44 of the main control finger member 20 is progressively disengaged toward the right under the action of the ramp 56.

The operation of this first embodiment of the control device according to the invention will now be described.

In starting in the neutral position shown in FIGS. 1, 3a and 3b, the selection and the engagement of one of the first four forward gear ratios are effected in the conventional manner by acting on the control shaft 12 so as to shift the main control finger member to the left or the right and then cause its rotation in one of two directions of rotation depending on the gear ratio to be engaged It can easily be seen that, owing to the distance D1 between the two control finger members, when one of these first four forward gear ratios is selected, the auxiliary control finger member 54 is never engaged in the lateral end yoke 46 for selecting the reverse gear.

In starting in the neutral position, the selection of the forward gear ratio of the highest rank is effected by shifting the main control finger member 20 to the right until its free end 44 comes to occupy the position shown in FIGS. 4a and 4b in which it bears laterally toward the right against the lateral end abutment 58. In this position, the free end 62 of the auxiliary finger member or the control finger member 54 is not engaged in the lateral end yoke 46 of the reverse gear proper, it is simply in confronting relation to the lateral extension 60. The forward gear ratio of the highest rank is engaged (see FIGS. 5a and 5b) by causing a rotation of the control shaft in such manner as to cause the sliding of the lateral end yoke 48 in the upward direction as viewed in FIG. 4b. Upon this movement, the free end 62 of the auxiliary control finger member 54 is free to move upwardly in a direction parallel to the yoke 46 for engaging the reverse gear with which it does not interfere.

In starting in the selection position shown in FIGS. 4a and 4b, the engagement of the reverse gear is effected by causing a rotation of the control shaft 12 in such manner as to downwardly shift the free ends 44 and 62 of the control finger members 20 and 54. Upon this downward movement, as viewed in FIG. 5b, the end 44 of the control finger member 20 comes to cooperate with the ramp 56 and cause its progressive lateral disengagement, while the free end of the control finger member 54 simultaneously causes the downward sliding of the lateral end yoke 46 of the reverse gear and therefore the engagement of the reverse gear ratio. At the end of this simultaneous movement, the two control finger members occupy the position shown in FIGS. 6a and 6b.

The second embodiment of the invention shown in FIGS. 7a and 7b will now be described. Elements which are similar or identical to those of the first embodiment are designated by the same reference numerals.

The control device here comprises a control stirrup 64 which is mounted on the control shaft 12 in such manner as to be freely pivotable and slidable relative to the latter. The stirrup 64 is immobilized in translation relative to the case 10 of the gearbox by a fixed lateral positioning stud 66 which engages a transverse slot 68 provided in the upper branch 70 of the stirrup 64.

The left lateral branch, as viewed in FIGS. 7a and 7b, of the stirrup 64 constitutes the auxiliary control finger member whose free end 62 is permanently engaged in the lateral end yoke 46 for engaging the reverse gear.

The other right lateral branch 72 of the stirrup 64 extends in a direction parallel to the lateral branch 54 and has a driving yoke 74 at its end. The driving yoke 74 is in juxtaposed relation to the lateral end yoke 48 for engaging the forward gear ratio of the highest rank, on the right side of the yoke 48 as viewed in FIGS. 7a and 7b.

The driving yoke 74 includes a central opening 76 in which is capable of extending and engaging the end portion 44 of the main control finger member 20 after it has been laterally disengaged from the yoke 48 under the action of the ramp 56. In this embodiment, the lateral end abutment 58 is provided on the driving yoke 76.

The five forward gear ratios are selected and engaged in a manner identical to that described with reference to the first embodiment of the invention, the control shaft 12 and the main control finger member being shifted independently of the auxiliary control finger member 54.

The reverse gear ratio is engaged by shifting downwardly (as viewed in FIG. 7) the free end 44 of the main control finger member 20 when the latter is engaged in the lateral end yoke 48. This downward movement causes, by cooperation with the ramp 56, the lateral disengagement to the right of the free end 44 of the main control finger member 20 until the latter comes to be engaged in the opening 76 of the driving yoke 74. Upon this engagement, pursuing this downward movement of the finger member 44 causes a simultaneous movement in the same direction of the free end 62 of the auxiliary control finger member 54 and therefore finally the engagement of the reverse gear ratio.

I claim:

1. A device for controlling an automobile vehicle gearbox which has a case and movable elements for engaging different gear ratios, said device comprising for shifting said movable elements yokes which are substantially parallel to one another and slidable in substantially parallel directions, said yokes including two lateral end yokes, a control shaft which is slidable in a direction substantially perpendicular to said directions of sliding of the yokes, a main finger member mounted on the control shaft to be rotatable and movable in translation with the control shaft, the main finger member being slidable for selecting any one of the yokes and engaging said selected one of the yokes and pivotable for sliding the selected yoke in at least one direction for engaging the respective gear ratio, an auxiliary control finger member pivotable about the axis of the control shaft, driving means interconnecting the two control finger members, the auxiliary control finger member being pivotable about the axis of the control shaft for sliding a first one of said two lateral end yokes in a first direction and causing the engagement of the reverse gear ratio, it only being possible to shift a second one of said two lateral end yokes by means of the main control finger member in the opposite direction for selecting a forward gear ratio of the highest rank, a first transverse abutment cooperative with said first lateral end yoke for preventing the sliding of the first lateral end yoke in said opposite direction, a second transverse abutent cooperative with said second lateral end yoke for preventing the sliding of said second lateral end yoke in said first direction, a ramp being provided on said second lateral end yoke, with which ramp cooperates the main control finger member when the main control finger member is shifted in said first direction for causing its lateral disengagement from said second lateral end yoke and permitting a driving in rotation of the auxiliary control finger member about the axis of said control shaft by said driving means interconnecting the two control finger members.

2. A device according to claim 1, wherein said ramp is so oriented as to cause the lateral disengagement of the main control finger member from a side of said second lateral end yoke remote from the other yokes.

3. A device according to claim 1, wherein the auxiliary control finger member is connected to rotate and move in translation with the control shaft and the lateral distance between the two control finger members thus interconnected exceeds the lateral distance between said two lateral end yokes.

4. A device according to claim 3, wherein said first lateral end yoke comprises an extension which extends laterally on a side of the said first lateral end yoke remote from the other yokes and in confronting relation to the auxiliary control finger member when the main control finger member is engaged in said second lateral end yoke.

5. A device according to claim 1, comprising a lateral abutment which cooperates with the main control finger member upon the engagement of the main control finger member in said second lateral end yoke for limiting the engagement travel thereof.

6. A device according to claim 6, wherein the lateral abutment is provided on said second lateral end yoke.

7. A device for controlling an automobile vehicle gearbox which has a case and movable elements for engaging different gear ratios, said device comprising, for shifting said movable elements, yokes which are substantially parallel to one another and slidable in substantially parallel directions, said yokes including two lateral end yokes, a control shaft which is slidable in a direction substantially perpendicular to said directions of sliding of the yokes, a main finger member mounted on the control shaft to be rotatable and movable in translation with the control shaft, the main finger member being slidable for selecting any one of three adjacent yokes and engaging said selected one of the yokes and pivotable for sliding the selected yoke in at least one direction for engaging the respective gear ratio, an auxiliary control finger member pivotable about the axis of the control shaft, driving means interconnecting the two control finger members, the auxiliary control finger member being pivotable about the axis of the control shaft for sliding a first one of said two lateral end yokes in a first direction and causing the engagement of the reverse gear ratio, it only being possible to shift a second one of said two lateral end yokes by means of the main control finger member in the opposite direction for selecting a forward gear ratio of the highest rank, a first transverse abutment cooperative with said first lateral end yoke for preventing the sliding of the first lateral end yoke in said opposite direction, a second transverse abutment cooperative with said second lateral end yoke for preventing the sliding of said second lateral end yoke in said first direction, a ramp being provided on said second lateral end yoke, with which ramp cooperates the main control finger member when the main control finger member is shifted in said first direction for causing its lateral disengagement from said second lateral end yoke and permitting a driving in rotation of the auxiliary control finger member about the axis of said control shaft by said driving means interconnecting the two control finger members, further including a control stirrup rotatively and slidably mounted on the control shaft, and means for immobilizing the stirrup in translation relative to the case of the gearbox, said stirrup having one lateral branch which constitutes the auxiliary control finger member which is permanently engaged in said first lateral end yoke and another branch which carries at an end thereof a driving yoke which is in juxtaposed relation to said second lateral end yoke for engaging the forward gear ratio of the highest rank, in which driving yoke the main control finger member comes to be engaged after having been laterally disengaged from said second lateral end yoke.

8. A device according to claim 7, comprising a lateral abutment which cooperates with the main control finger member upon the engagement of the main control finger member in said second lateral end yoke for limiting the engagement travel thereof, the lateral abutment being provided on said driving yoke of the stirrup.

* * * * *